W. V. TURNER.
TRIPLE VALVE DEVICE FOR FLUID PRESSURE BRAKES.
APPLICATION FILED MAR. 25, 1907.
1,131,178.
Patented Mar. 9, 1915.
2 SHEETS—SHEET 1.
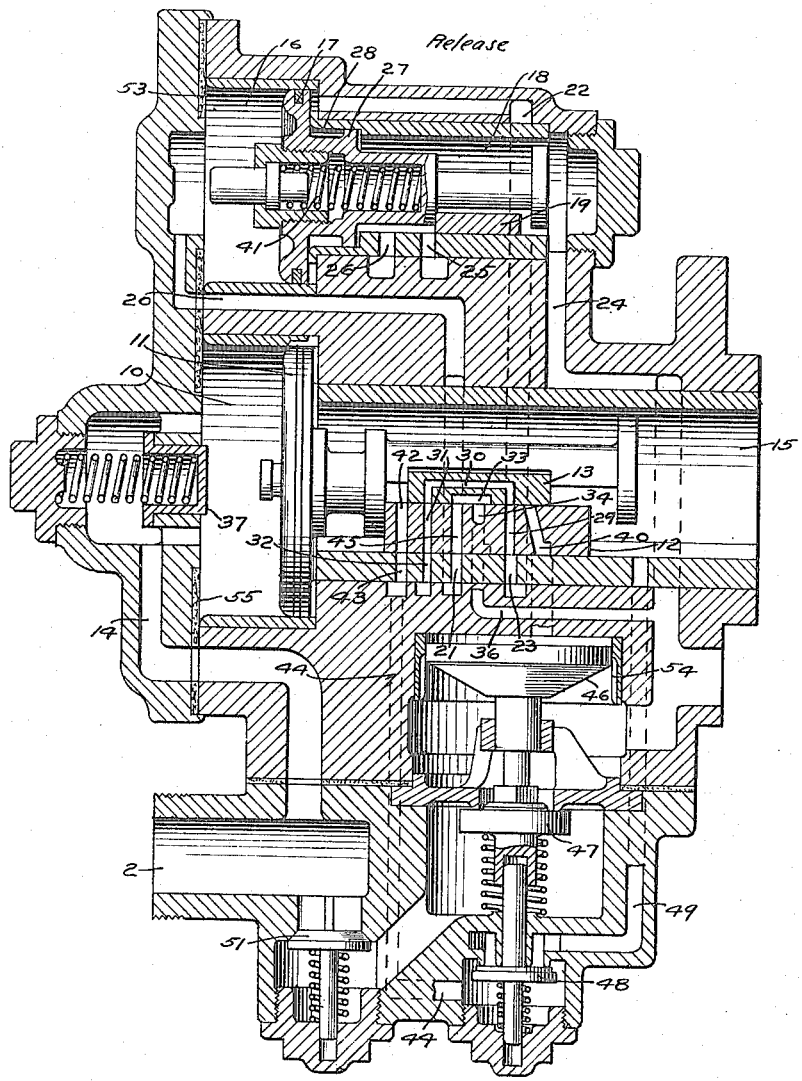
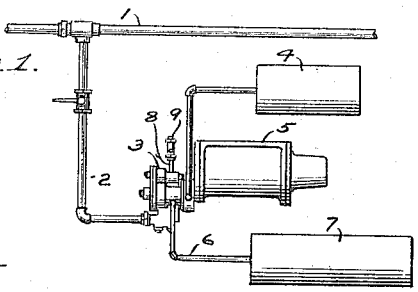

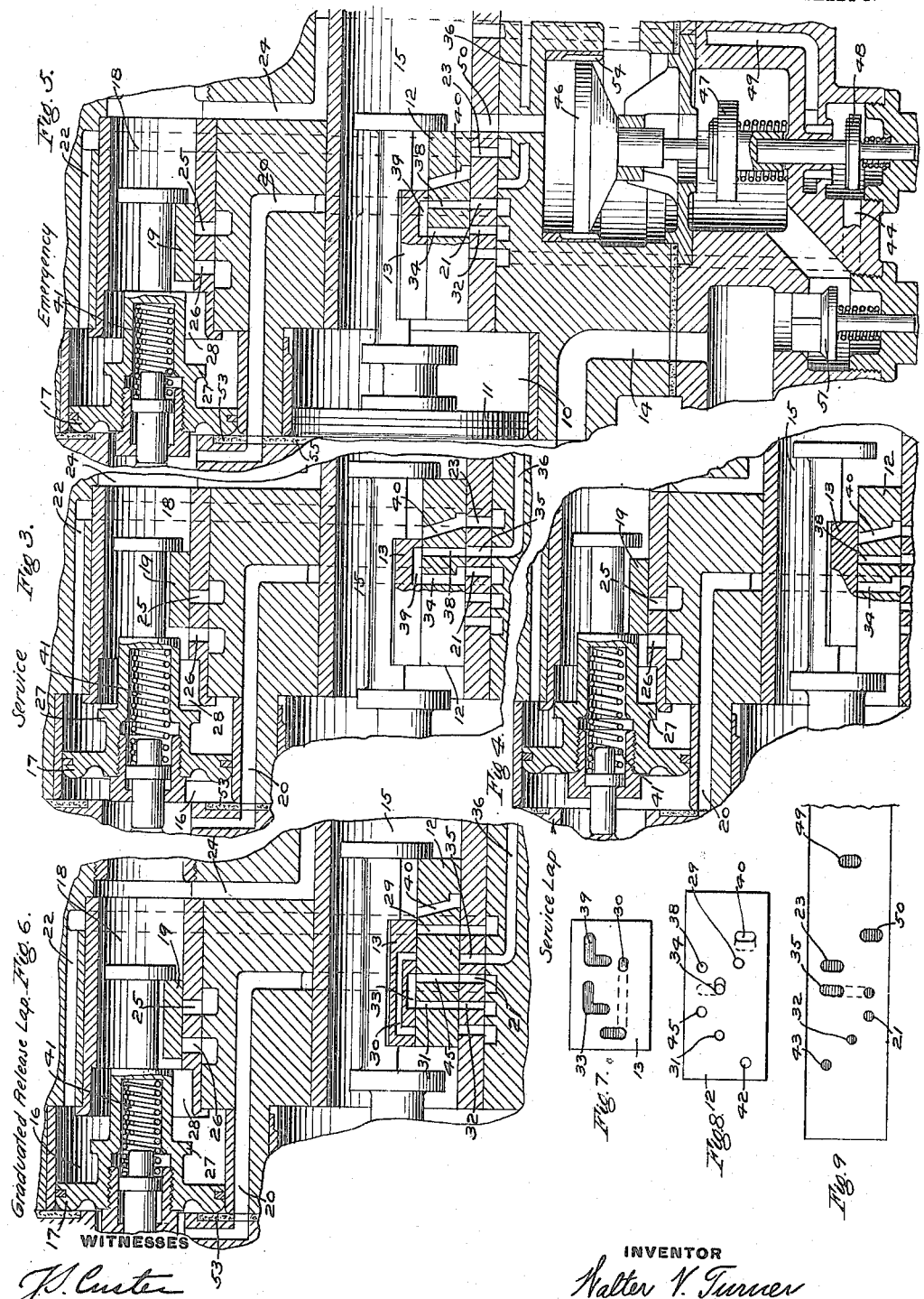

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

TRIPLE-VALVE DEVICE FOR FLUID-PRESSURE BRAKES.

1,131,178.                    Specification of Letters Patent.        Patented Mar. 9, 1915.

Application filed March 25, 1907. Serial No. 364,215.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices for Fluid-Pressure Brakes, of which the following is a specification.

This invention relates to automatic fluid pressure brakes, and has for its principal object to provide an improved triple valve mechanism of large capacity, wherein the resistance of the valve parts to movement is greatly reduced and the large volumes of air which are necessarily employed in connection with the larger brake cylinders and the higher pressures now being used in brake systems, may be readily controlled by the usual size of triple valve piston operating under the ordinary differential of fluid pressures.

Another object is to provide means in a triple valve mechanism of this character for graduating the release after the brakes have been applied.

Another object is to provide improved means for controlling a communication from the brake cylinder through a blow-down or safety valve, wherein the communication is open in service applications and is closed or restricted in emergency applications of the brakes.

Another object is to provide improved means for controlling a communication between a supplemental source of fluid pressure and the auxiliary reservoir, whereby a higher degree of pressure is obtained in the brake cylinder in an emergency application of the brakes.

In order to handle the large volumes of air employed in connection with the larger brake cylinders, the size of the triple valve ports and cavities have necessarily been increased and the cavities in the face of the main slide valve, which, in the release position, are open to the atmosphere, have, by reason of their greater area, correspondingly augmented the unbalanced pressure acting on the valve, whereby its resistance to movement is considerably increased, so that, in order to secure the desired facility of movement, such as is obtained in the usual triple valve device, it has been necessary to greatly increase in size the triple valve piston.

The present construction permits the use of triple valve pistons of the usual small size, and comprises in general a supplemental valve mechanism operated by variations in fluid pressure for controlling the exhaust from the brake cylinder, and a main piston and valve mechanism operated by variations in train pipe pressure and adapted to control the fluid pressure acting on said supplemental valve mechanism in order to operate the same. In order to retain the maximum braking pressure in the brake cylinder during an emergency application of the brakes, the supplemental valve mechanism may also control a communication from the brake cylinder through a safety or blow-down valve, whereby in emergency applications the communication from the brake cylinder through the valve is closed or restricted.

The invention will now be more fully described and set forth in connection with the drawings, which show a preferred form of triple valve device embodying my invention.

In the accompanying drawings; Figure 1 is a diagrammatic elevational view of a car equipment embodying the invention; Fig. 2 a central sectional view of the triple valve device, showing the parts in normal brake release position; Fig. 3 a similar view, partly broken away, showing the position of the parts in service application position; Fig. 4 a similar view showing the position of the parts in service lap position; Fig. 5 a similar view showing the position of the parts in the emergency position; Fig. 6 a similar view showing the position of the parts in graduated release lap position; Fig. 7 a face view of the auxiliary or graduating valve showing the arrangement of cavities; Fig. 8 a face view of the main slide valve showing the arrangement of ports; and Fig. 9 a plan view of the main slide valve seat showing the arrangement of ports.

The car air brake equipment comprises the train pipe 1, branch pipe 2, triple valve device 3, connected to the auxiliary reservoir 4 and brake cylinder 5, and also connected by a pipe 6 to a supplemental reservoir 7, and by a pipe 8 to a safety or blow-down valve 9.

According to the present embodiment, my invention comprises a main abutment 11, contained in piston chamber 10, which is open to the train pipe through a passage 14, and a main slide valve 12 having an auxiliary valve 13 contained in a valve chamber 15 which is open to the auxiliary reservoir. The main slide valve 12 and its auxiliary valve 13 control ports which communicate with a supplemental abutment having differential piston heads 17 and 27. The piston head 17 is contained in the piston chamber 16, which communicates through a passage 20 with a port 21 in the main slide valve seat, and the opposite side of the piston head communicates through a passage 22 with a port 23 in said main slide valve seat. The piston head 27 normally closes communication between the passage 22 and the valve chamber 18, which is open to the brake cylinder through a passage 24. The supplemental valve 19 controls two ports, the brake cylinder exhaust port 25 and the port 26, which communicates through a pipe 8 with the safety or blow-down valve 9.

When the parts are in normal release position, as indicated in Fig. 2, the passage 22, which communicates with the space on one side of piston 17 of the supplemental abutment is open to the atmosphere through port 23, in the main slide valve seat, port 29 in the main slide valve, cavity 30 in the auxiliary slide valve, port 31 and an exhaust port 32; and the chamber 16 on the opposite face of the piston 17 is in communication with the brake cylinder through passage 20, port 21, port 45 in the main slide valve, cavity 33 in the auxiliary slide valve, port 34, and ports 35 and 36, while the valve chamber 18 and the brake cylinder, which is in free open communication therewith through passage 24, are open to the main exhaust port 25. In this position also, the port 43 in the main slide valve seat, which port communicates with the pipe 6 and supplemental reservoir 7, registers with port 42 in the main slide valve, so that both the auxiliary reservoir and the supplemental reservoir may be charged from the train pipe in the usual manner.

In order to make a service application of the brakes, the train pipe pressure is reduced in the usual way and the preponderance of pressure on the auxiliary reservoir side of the main abutment 11 is sufficient to shift said abutment to engage the usual graduating stop 37. In this position, the main slide valve ports 34 and 38 are connected by the cavity 39 in the auxiliary slide valve and register respectively with the port 21 of passage 20 and port 35 of the brake cylinder passage 36, so that the chamber 16 on one side of the piston 17 of the supplemental abutment is open to the brake cylinder. The other side of the piston 17 is now open to pressure from the auxiliary reservoir through port 40 in the main slide valve 12, which is uncovered by the auxiliary valve 13, and which registers with port 23 of passage 22. The brake cylinder being at atmospheric pressure, and accordingly the outer face of the piston head 17, the fluid pressure admitted to the passage 22 from the auxiliary reservoir moves the supplemental abutment and the supplemental valve 19, closing the brake cylinder exhaust port 25. Further movement of said abutment compresses the spring 41 and is sufficient to withdraw the piston head 27 of the supplemental abutment from its chamber 28 and open a communication from the passage 22 to the valve chamber 18, so that the fluid under pressure from the auxiliary reservoir flows into said valve chamber, thence through the brake cylinder passage 24 to the brake cylinder. Air continues to flow to the brake cylinder through the open communication until the opposing train pipe and auxiliary reservoir pressures on the main abutment equalize or until that in the train pipe slightly preponderates. The main abutment then moves back, shifting the auxiliary valve 13 to the lap position, as shown in Fig. 4. In this position the main slide valve service port 40 is closed and also the communication between the brake cylinder and the passage 20. The fluid pressures on the opposite sides of the supplemental abutment soon equalize, so that the spring 41 moves said abutment back and the piston 27 reënters its chamber, closing the communication between the passage 22 and the valve chamber 18.

The parts are now in service lap position, as indicated in Fig. 4. It is preferable to provide sufficient lost motion between the supplemental abutment and the supplemental valve so that said valve remains stationary in the movement between service application position and service lap, as thereby the supplemental abutment is more easily shifted. By making further reduction in train pipe pressure the above operation may be repeated and the brake cylinder pressure increased or graduated up to any desired amount. It will be noted that in service application position and service lap the port 26, connected to the safety valve, remains uncovered, so that the pressure in the brake cylinder is limited to that for which the safety valve is set.

The brakes may be released by increasing the train pipe pressure in the usual way, causing the main abutment to shift to normal release position, Fig. 2, in which the inner face of the supplemental abutment is open to the atmosphere through passage 22 and ports in the main slide valve, as hereinbefore described, while the outer face of said abutment is open to pressure from the brake cylinder, which pressure moves said supplemental abutment and valve 19 to release position, thereby opening the brake cylinder exhaust port 25.

In order to grade down the brake cylinder pressure after the brakes have been applied, the brake valve is moved to release position and then back to lap. A wave of increased fluid pressure is thus caused to flow in the train pipe, which shifts the main abutment 11 and valves 12 and 13 to release position. In this position, as hereinbefore described, one side of the piston 17 of the supplemental abutment is exposed to fluid pressure from the brake cylinder through the passage 20, and the other side is open to the atmosphere through passage 22. The piston 27 of the supplemental abutment is also subject to pressure from the brake cylinder, but as the piston 17 is of greater area than the piston 27, the pressure on its differential area moves the supplemental abutment and valve inwardly and opens the brake cylinder exhaust port 25. The brake cylinder exhaust port is closed after a portion of the brake cylinder pressure is vented, and this part of the operation is as follows:—In the release position of the main abutment 11 the port 42 in the main slide valve registers with the supplemental reservoir port 43 and as the said port 42 is uncovered by the movement of the auxiliary valve 13, fluid pressure stored in the supplemental reservoir is vented to the valve chamber 15, the pressure in the valve chamber and auxiliary reservoir is thereby raised sufficiently to move the main abutment 11 and the auxiliary valve 13 to graduated release lap position, as shown in Fig. 6. The main slide valve does not move, and consequently the ports 31 and 45 are still in register respectively with exhaust port 32 and port 21 of passage 20. The auxiliary slide valve cavity 33 now connects the ports 31 and 45, so that the chamber 16 on one side of the piston 17 is vented to the atmosphere, consequently the unopposed pressure from the brake cylinder to which the piston head 27 is subject is sufficient to shift the supplemental abutment to its extreme outer position in which it seats on the gasket 53. The supplemental valve 19 is thereby moved and closes exhaust port 25. The brake cylinder exhaust port is thus opened and then closed, thereby releasing a portion of the brake cylinder pressure. If a further reduction in brake cylinder pressure is desired, the train pipe pressure is again increased, as before, causing the main abutment and auxiliary valve to move to normal release position, in which position the outer face of the piston 17 of the supplemental abutment is open to the brake cylinder and the inner face to the atmosphere, through the passage 22. The fluid pressures on the supplemental abutment are therefor substantially balanced, except that the flow of air from the valve chamber to the passage 22 slightly reduces the pressure on the inner side of the supplemental abutment, so that the spring 41 readily moves said abutment inwardly and the piston 27 reënters its chamber. Further movement of the supplemental abutment is due to the unbalanced pressure from the brake cylinder on the outer face of the piston 17 by reason of the difference in areas of the pistons 17 and 27. The supplemental abutment having moved to its inner position, the brake cylinder exhaust port is opened and fluid from the brake cylinder is again discharged to the atmosphere. The valve mechanism then operates to close the exhaust port in the same manner, as hereinbefore described.

The emergency valve mechanism may comprise an emergency piston 46 for operating an emergency valve 47, which controls communication between the train pipe and the brake cylinder through a check valve 51 in the well-known way. The emergency piston 46 also operates a by-pass valve 48, which controls communication from the passage 44 to the supplemental reservoir 7, or other source of fluid pressure supply and the passage 49, which preferably leads to the auxiliary reservoir.

In order to make an emergency application of the brakes, the usual sudden reduction in train pipe pressure is made, which shifts the main abutment 11 and valves 12 and 13 to the extreme outer position, as shown in Fig. 5, thereby opening port 50 to admit auxiliary reservoir pressure to the emergency piston 46, whereby said piston is moved and opens the emergency valve 47, so that train pipe air is vented through the check valve 51 to the brake cylinder, thereby hastening the operation of the successive triple valves to produce quick serial action throughout the train in the well-known way. By the same movement of the emergency piston the by-pass valve 48 is opened and air from the supplemental reservoir flows from the passage 44 into the passage 49, thence to the auxiliary reservoir, augmenting the pressure therein. The combined pressures flow to the brake cylinder through port 50 and a port 54 around the emergency piston 46 to the brake cylinder, thereby securing a much higher degree of pressure in the brake cylinder according to the capacity of the supplemental source of fluid pressure supply.

In the emergency position of the main valve, the outer face of the supplemental piston is open to the atmosphere through passage 20, port 21, port 38 in the main slide valve, cavity 39, and port 34 to exhaust port 32, so that the brake cylinder pressure in valve chamber 18 shifts the supplemental abutment to its seat on the gasket 53, as shown in Fig. 5. In this position the supplemental valve 19 closes the communication between the brake cylinder and the safety valve port 26 as well as the exhaust port 25, consequently all the pressure admitted to the brake cylinder is retained, which is very desirable in emergency applications of the brakes. It is obvious that the supplemental valve 19 may be provided with a small port, or other means adapted to register with the port 26 and restrict the passage to the safety valve, if desired, so that a gradual reduction may be had in the brake cylinder pressure while the parts are in the emergency application position. It is further obvious that various other types of emergency valve mechanisms may be used, or such mechanism may be omitted entirely without affecting the operation of my invention as to the other functions.

From the foregoing description of the invention, it is obvious that the usual small size triple valve piston is sufficient to readily control the movement of air to and from the brake cylinder, the ports in the main slide valve being small and there being no cavities therein to produce unbalanced pressure on the valve.

Having now described my invention, what I claim as new, and desire to secure by Letters Patent, is:—

1. In a fluid pressure brake, the combination with a train pipe and an automatic valve device in which the usual cavity for connecting the brake cylinder passage with an exhaust port is eliminated and operated by variations in train pipe pressure, of a supplemental valve mechanism subject to fluid pressure on opposite sides for controlling the brake cylinder exhaust port and means controlled by said automatic valve device for varying the fluid pressure on said valve mechanism.

2. In a fluid pressure brake, the combination with a train pipe and an automatic valve device operated by variations in train pipe pressure, of a valve for controlling the brake cylinder exhaust, a movable abutment for actuating said valve, and means controlled by said valve device for varying the fluid pressure on opposite sides of said abutment.

3. In a fluid pressure brake, the combination with a train pipe, reservoir, brake cylinder, and an automatic valve device operating in response to variations in train pipe pressure for supplying fluid from said reservoir to the brake cylinder and having no large cavity open to atmospheric pressure in release position, of a supplemental valve mechanism comprising a valve for controlling the brake cylinder exhaust port and a movable abutment operated by fluid under pressure for actuating said valve, and means controlled by said valve device for varying the fluid pressure on said abutment.

4. In a fluid pressure brake, the combination with a train pipe, source of fluid under pressure, brake cylinder, and an automatic valve device operated upon a reduction in train pipe pressure for supplying fluid from said source to the brake cylinder, of a supplemental valve for controlling the brake cylinder exhaust port, a piston for actuating said valve, and means controlled by said valve device for varying the fluid pressures on opposite sides of said piston.

5. In a fluid pressure brake, the combination with a train pipe, auxiliary reservoir, and brake cylinder, of a main abutment subject to the opposing pressures of the train pipe and the auxiliary reservoir, a supplemental piston controlled by variations in fluid pressure, a valve operated by said supplemental piston for controlling the brake cylinder exhaust port, and a main valve means operated by said main abutment for controlling variations in fluid pressure on said supplemental piston and adapted, upon a reduction in train pipe pressure, to admit fluid pressure to one side of said supplemental abutment to operate said valve and thereby close the brake cylinder exhaust port, and to open a communication from the auxiliary reservoir to the brake cylinder.

6. In a fluid pressure brake, the combination with a train pipe, auxiliary reservoir, and brake cylinder, of a main valve means having no cavity adapted to serve as a brake cylinder exhaust cavity, an actuating piston therefor operated by variations in train pipe pressure for controlling the supply of fluid from the auxiliary reservoir to the brake cylinder, a supplemental valve for controlling the sole brake cylinder exhaust port, a piston for actuating said valve, and means controlled by said main valve means for varying the fluid pressure on said supplemental piston.

7. In a fluid pressure brake, the combination with a train pipe and brake cylinder, of a supplemental abutment controlled by variations in fluid pressure, a valve operated by said supplemental abutment for controlling the brake cylinder exhaust port, and a main valve and piston operated by a sudden reduction in train pipe pressure to release fluid from one side of said supplemental abutment.

8. In a fluid pressure brake, the combination with a train pipe, auxiliary reservoir, brake cylinder, and safety valve, of a supplemental abutment, a valve mechanism operated by said abutment for controlling the main brake cylinder exhaust and communication from the brake cylinder through the safety valve, a main abutment subject to the opposing pressures of the train pipe and the auxiliary reservoir, and means operated by said main abutment for controlling the movement of said supplemental abutment.

9. In a fluid pressure brake, the combination with a train pipe, auxiliary reservoir, and brake cylinder, of a supplemental abutment and valve actuated thereby for controlling the main brake cylinder exhaust port, said abutment having differential piston heads, one subject to brake cylinder pressure and controlling a brake cylinder communication, a main abutment and valve operated by variations in train pipe pressure, and adapted in a service application to admit air from the auxiliary reservoir to one side of said supplemental abutment and open said brake cylinder communication, and a spring device for returning said supplemental abutment to close the brake cylinder communication.

10. In a fluid pressure brake, the combination with a train pipe, auxiliary reservoir, and brake cylinder, of a supplemental abutment and valve for controlling the main brake cylinder exhaust port, said abutment having differential piston heads, one subject to brake cylinder pressure and controlling a brake cylinder communication, a main abutment and valve operated by variations in train pipe pressure for controlling communication to said supplemental abutment, and adapted in a service application of the brakes to admit fluid pressure from the brake cylinder to one side of said supplemental abutment and fluid pressure from the auxiliary reservoir to the other side and open said brake cylinder communication.

11. In a fluid pressure brake, the combination with a train pipe, auxiliary reservoir, and brake cylinder, of a supplemental valve for controlling the main brake cylinder exhaust, a differential piston normally subject to brake cylinder pressure for operating said valve and having one piston head controlling a brake cylinder communication, a spring tending to move said piston head to close said communication, and a main valve and abutment operated by variations in train pipe pressure and having ports adapted in application position to supply fluid from the auxiliary reservoir to one side of the differential piston to open said brake cylinder communication, and in release position to release fluid from said piston.

12. In a fluid pressure brake, the combination with a brake cylinder and a safety valve for limiting the pressure in the brake cylinder, of a supplemental valve for controlling the outlet from the brake cylinder through the safety valve, and a main valve mechanism operated by variations in train pipe pressure for controlling the movement of the supplemental valve.

13. In a fluid pressure brake, the combination with a brake cylinder and a safety valve for limiting the pressure in the brake cylinder, of a supplemental abutment and valve for controlling the outlet from the brake cylinder through the safety valve, and a main valve and piston operated by variations in train pipe pressure for controlling the fluid pressure on said supplemental abutment.

14. In a fluid pressure brake, the combination with a brake cylinder and a safety valve for limiting the pressure in the brake cylinder, of a supplemental abutment and valve for controlling the outlet from the brake cylinder through the safety valve, and a main valve and piston operated by a sudden reduction in train pipe pressure for varying the pressure on one side of said supplemental abutment and causing the supplemental valve to close said outlet.

15. In a fluid pressure brake, the combination with a brake cylinder and a safety valve for limiting the pressure in the brake cylinder, of a supplemental abutment and valve for controlling the outlet from the brake cylinder through the safety valve, and a main valve and piston operated upon a sudden reduction in train pipe pressure to vent fluid from one side of said supplemental abutment.

16. In a fluid pressure brake, the combination with a brake cylinder and a safety valve for limiting the pressure in the brake cylinder, of a supplemental valve for controlling the outlet from the brake cylinder through the safety valve, a movable abutment subject to brake cylinder pressure for operating said supplemental valve, and a main valve and piston operated by a sudden reduction in train pipe pressure for venting one side of said supplemental abutment to the atmosphere.

17. In a fluid pressure brake, the combination with a brake cylinder and a safety valve for limiting the pressure in the brake cylinder, of a supplemental abutment and valve for controlling the main brake cylinder exhaust and the outlet from the brake cylinder through the safety valve, and a main valve and piston operated by variations in train pipe pressure for controlling the fluid pressure acting on said supplemental abutment.

18. A triple valve device, comprising a supplemental valve mechanism operated by fluid pressure for controlling the brake cylinder exhaust, and a main piston and valve operated by variations in train pipe pressure and having means for controlling the fluid pressure for actuating the supplemental valve and the supply of fluid from an additional source of pressure to one side of the main piston.

19. In a fluid pressure brake, the combination with a train pipe, auxiliary reservoir, brake cylinder, and an additional source of fluid pressure, of a supplemental fluid pressure actuated abutment and valve for controlling the brake cylinder exhaust port, and a main piston and valve means operated by variations in train pipe pressure for controlling the fluid pressure on said supplemental abutment and the supply of fluid from said additional source to one side of said main piston.

20. In a fluid pressure brake, the combination with a train pipe, auxiliary reservoir, brake cylinder, and an additional source of fluid pressure, of a supplemental fluid pressure actuated abutment and valve for controlling the brake cylinder exhaust port, and a main piston and valve means operated by the opposing pressures of the train pipe and the auxiliary reservoir for controlling the fluid pressure on said supplemental abutment, and communication from the additional source of pressure to the auxiliary reservoir.

21. In a fluid pressure brake, the combination with a train pipe, auxiliary reservoir, brake cylinder, and an additional source of fluid pressure, of a supplemental fluid pressure actuated abutment and valve for controlling the brake cylinder exhaust port, and a main piston and valve means operated by an increase in train pipe pressure for releasing fluid from one side of said supplemental abutment and for opening communication from said additional source to the auxiliary reservoir side of the main piston.

22. In a fluid pressure brake, the combination with a train pipe, auxiliary reservoir, brake cylinder, and an additional source of fluid pressure, of a supplemental fluid pressure actuated abutment and valve for controlling the brake cylinder exhaust port, a main piston and a main and an auxiliary valve operated by said piston under variations in train pipe pressure for controlling the fluid pressure on said supplemental abutment and the supply of fluid from said additional source to one side of the main piston.

23. A triple valve device, comprising a supplemental valve for controlling the brake cylinder exhaust port, a movable abutment normally subject to brake cylinder pressure for operating said valve, a main piston, a main valve and an auxiliary valve operated by said piston under variations in train pipe pressure for controlling the fluid pressure acting on said supplemental abutment and the supply of fluid from the auxiliary reservoir to the brake cylinder.

24. In a fluid pressure brake, the combination with a train pipe, auxiliary reservoir, brake cylinder, and an additional source of fluid pressure, of a supplemental fluid pressure actuated abutment and valve for controlling the brake cylinder exhaust port, valve means operated by an emergency piston and valve for venting fluid from the train pipe, a valve operated by the emergency piston for opening communication from the supplemental reservoir to augment the brake cylinder pressure, and a main piston and valve operated by variations in train pipe pressure for controlling the fluid pressure acting on the supplemental abutment and on the emergency piston.

25. In a fluid pressure brake, the combination with a brake cylinder and an additional source of fluid pressure supply, of a supplemental valve for controlling the brake cylinder exhaust port, a movable abutment subject to brake cylinder pressure for operating said supplemental valve, a main valve and piston operated by an increase in train pipe pressure in brake applied position to vent air from one side of said movable abutment and open said brake cylinder exhaust port, and to open a communication from the additional source of fluid pressure supply to the auxiliary reservoir to shift said main piston and valve and thereby vent air from the other side of said supplemental abutment to close said exhaust port.

26. In a fluid pressure brake, the combination with a train pipe, auxiliary reservoir, brake cylinder, and a supplemental reservoir, of a valve mechanism for controlling the main brake cylinder exhaust port, an emergency valve device for controlling the supply of air from said supplemental reservoir to the brake cylinder and a main piston and valve means for controlling the operation of said exhaust valve mechanism and the emergency valve device.

27. In a fluid pressure brake, the combination with a triple valve, brake cylinder, and saftey valve for limiting the pressure in the brake cylinder in service applications, of means operating in an emergency application of the brakes for closing communication from the brake cylinder to the safety valve.

28. In a fluid pressure brake, the combination with a supplemental valve mechanism for controlling the release of air from the brake cylinder, of an automatic valve device subject to train pipe pressure and adapted upon a gradual increase in train pipe pressure to first increase the fluid pressure on one side of said supplemental valve mechanism to open communication for releasing air from the brake cylinder and then reduce said fluid pressure to close said communication.

29. In a fluid pressure brake, the combination with a valve mechanism for controlling the exhaust of air from the brake cylinder, of an automatic valve device controlled by variations in train pipe pressure and provided with means for controlling the fluid pressure on said valve mechanism to operate the same, said automatic valve device being adapted upon a gradual increase in train pipe pressure to first move to one position and vary the pressure on said valve mechanism to cause the opening of the exhaust from the brake cylinder and then to move to another position and vary the pressure on said valve mechanism to cause the closing of the exhaust from the brake cylinder.

30. In a fluid pressure brake, the combination with a valve mechanism for controlling the exhaust of air from the brake cylinder, of an automatic valve device controlled by variations in train pipe pressure and provided with means for controlling the fluid pressure on said valve mechanism to operate the same, said automatic valve device being adapted upon a gradual increase in train pipe pressure to successively move to different positions for varying the pressure on said valve mechanism to cause the same to first open and then close communication for releasing air from the brake cylinder.

31. In a fluid pressure brake, the combination with valve means for controlling the release of air from the brake cylinder and a movable abutment for actuating said valve means, of an automatic valve device subject to variations in train pipe pressure and adapted upon a gradual increase in train pipe pressure to first move to a position for supplying fluid to said abutment to open the exhaust from the brake cylinder, and means for moving the automatic valve device to a position for releasing fluid from said abutment to close the exhaust from the brake cylinder.

32. In a fluid pressure brake, the combination with a triple valve device for controlling the supply of air to the brake cylinder, of a blow down valve mechanism and a valve governed by said triple valve device for controlling the outlet from the brake cylinder through the blow down valve mechanism.

33. In a fluid pressure brake, the combination with a triple valve device comprising a main valve and piston operated by variations in train pipe pressure for controlling the supply of air to the brake cylinder, of a blow down valve device and a valve governed by the triple valve device for controlling an outlet from the brake cylinder through said blow down valve device.

34. An air brake equipment comprising a train pipe, auxiliary reservoir, brake cylinder, and a triple valve having a piston and main and graduating valves controlling communications between said components, combined with a supplemental reservoir and a passage therefrom governed by said triple valve whereby communication is established between the supplemental reservoir and auxiliary reservoir when train pipe pressure preponderates over auxiliary reservoir pressure, and said communication is cut off when auxiliary reservoir pressure preponderates over train pipe pressure, and whereby communication is established from said supplemental reservoir to the brake cylinder when auxiliary reservoir pressure preponderates largely over train pipe pressure and a relief valve normally communicating with the brake cylinder, and means for cutting off communication between the said relief valve and the brake cylinder when communication between the brake cylinder and supplemental reservoir is established, substantially as described.

In testimony whereof I have hereunto set my hand.

WALTER V. TURNER.

Witnesses:
R. F. EMERY,
J. B. MACDONALD.

Copies of this patent may be obtained for five cents each, by addressing the "Commissioner of Patents, Washington, D. C."